United States Patent [19]

Vilimek

[11] Patent Number: 4,641,539
[45] Date of Patent: Feb. 10, 1987

[54] SENSOR RESPONDING TO THE ACTION OF A FORCE

[75] Inventor: Vaclav F. Vilimek, Viecht, Fed. Rep. of Germany

[73] Assignee: Texas Instruments Incorporated, Dallas, Tex.

[21] Appl. No.: 752,277

[22] Filed: Jul. 5, 1985

[30] Foreign Application Priority Data

Aug. 8, 1984 [DE] Fed. Rep. of Germany ....... 3429250

[51] Int. Cl.$^4$ ............................ G01L 1/22; G01L 1/26
[52] U.S. Cl. ................................ 73/862.67; 73/517 R; 73/799
[58] Field of Search ............ 73/799, 775, 776, 862.65, 73/862.67, 517 R; 338/5, 43, 46, 47; 340/652

[56] References Cited

U.S. PATENT DOCUMENTS

| 3,596,269 | 7/1971 | Laska ................... 73/799 X |
| 4,071,838 | 1/1978 | Block ................... 338/47 |
| 4,484,132 | 11/1984 | Crites ................... 73/776 X |
| 4,546,652 | 10/1985 | Virkar et al. ........... 73/799 X |
| 4,553,436 | 11/1985 | Hansson ................. 73/517 R |

FOREIGN PATENT DOCUMENTS 1168118 11/1964 Fed. Rep. of Germany .
2029019 3/1980 United Kingdom ............... 73/799

Primary Examiner—Charles A. Ruehl
Attorney, Agent, or Firm—Richard A. Bachand; N. Rhys Merrett; Melvin Sharp

[57] ABSTRACT

A sensor (10) responding to the action a force comprises a base body (12) and a force takeup element (14) which is connected to the base body (12) via at least one support element (16, 18, 20, 22). The support element deforms under the influence of a force acting on the takeup element (14). In the deformation region between each support element (16, 18, 20, 22) and the force takeup element (14) a measuring member (32, 34, 36, 38) is disposed which reacts to the deformation with a change in a physical parameter. An uninterrupted conductor path (44) is provided which extends from a first terminal land (46) on the base body (12) via each support element (16, 18, 20, 22) and the force takeup element (14) to a second terminal land (48) on the base body (12).

6 Claims, 3 Drawing Figures

SENSOR RESPONDING TO THE ACTION OF A FORCE

The invention relates to a sensor responding to the action of a force and comprising a base body and a force takeup element which is connected to the base body via at least one support element which deforms under the influence of a force acting on the force take up element, a measuring member reacting to the deformation with a change of a physical parameter being disposed in the deformation region between each support element and the force takeup element.

With a sensor of this type it is possible for mechanical damage to occur to one or more support elements which hold the force takeup element. The mechanical damage may be such that although the sensor still furnishes measurement signals its response characteristic has changed so that the evaluation of these signals leads to wrong results.

The problem underlying the invention is to further develop a sensor of the type outlined so that to avoid incorrect measurements its functional state can be continuously checked with simple means.

this problem is solved according to the invention by an uninterrupted conductor path which extends from a first terminal land or pad on the base body via each support element and the force takeup element to a second terminal land or pad on the base body.

The conductor path used in the sensor according to the invention is uninterrupted when the sensor operates satisfactorily, i.e. when no mechanical damage is present. However, as soon as a support element breaks due to excessive mechanical stress the conductor path is also interrupted and this can be utilized to detect a fault condition.

In accordance with a preferred embodiment of the invention an arrangement is set forth for measuring a force using a sensor according to the invention and an evaluation circuit connected to the measuring member which is characterized in that a current passage test circuit is connected to the terminal lands on the base body and on detection of an interruption of the current passage through the conductor path renders the evaluation circuit inoperative. This arrangement avoids with certainty the display of falsified measurement results which are due to mechanical damage to the support elements.

An example of embodiment of the invention will be explained with the aid of the drawings, wherein.

Figure 1:
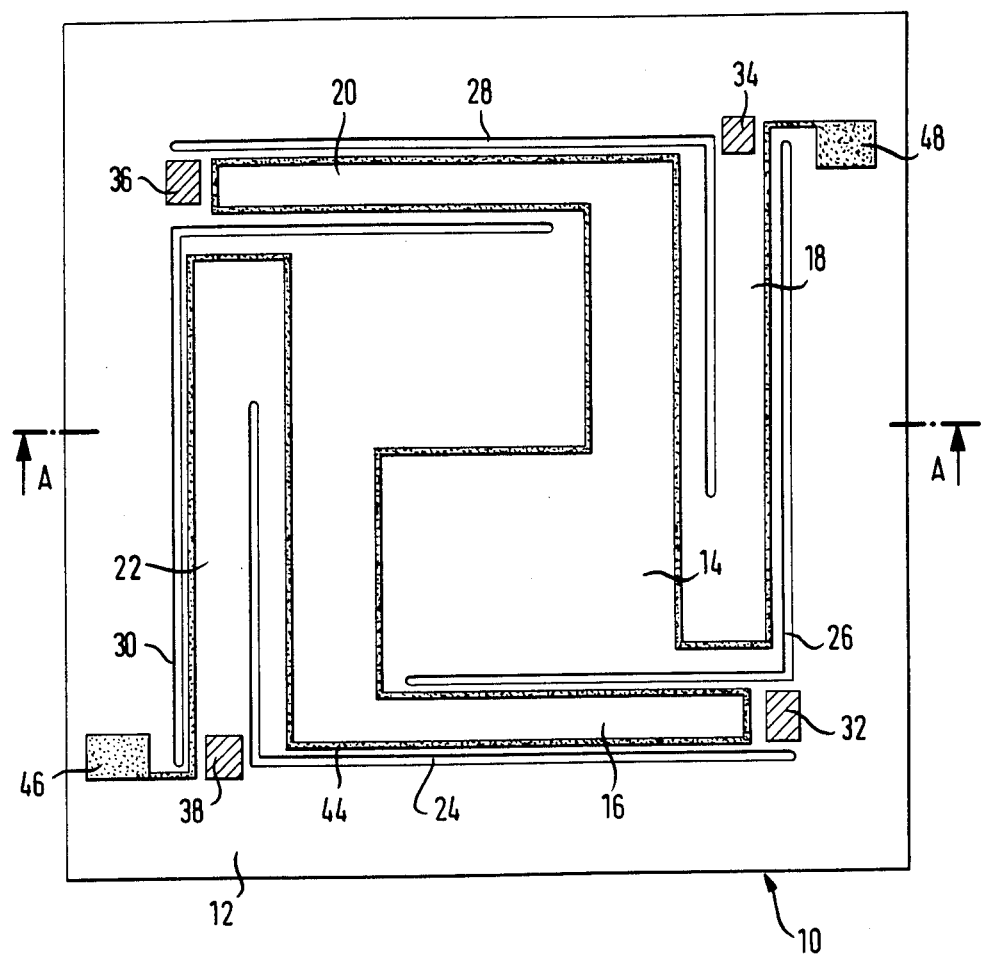
FIG. 1 is a plan view of the sensor according to the invention.

The sensor illustrated in FIG. 1 in plan view includes a base body 12 and a force takeup element 14 which is connected via four support elements 16, 18, 20 and 22 to the base body 12. The force takeup element 14 has a quadratic form and the support elements 16 to 22 extend parallel to the edges of the force takeup element 14. The support elements 16 to 22 are connected at one end to the base body 12 and at the other end to the force takeup element 14 at the corner regions thereof. On both sides of the support elements 16 to 22 slots 24, 26, 28 and 30 are disposed which separate the support elements between their ends from the base body 12 on the one hand and from the force takeup element 14 on the other.

Figure 2:
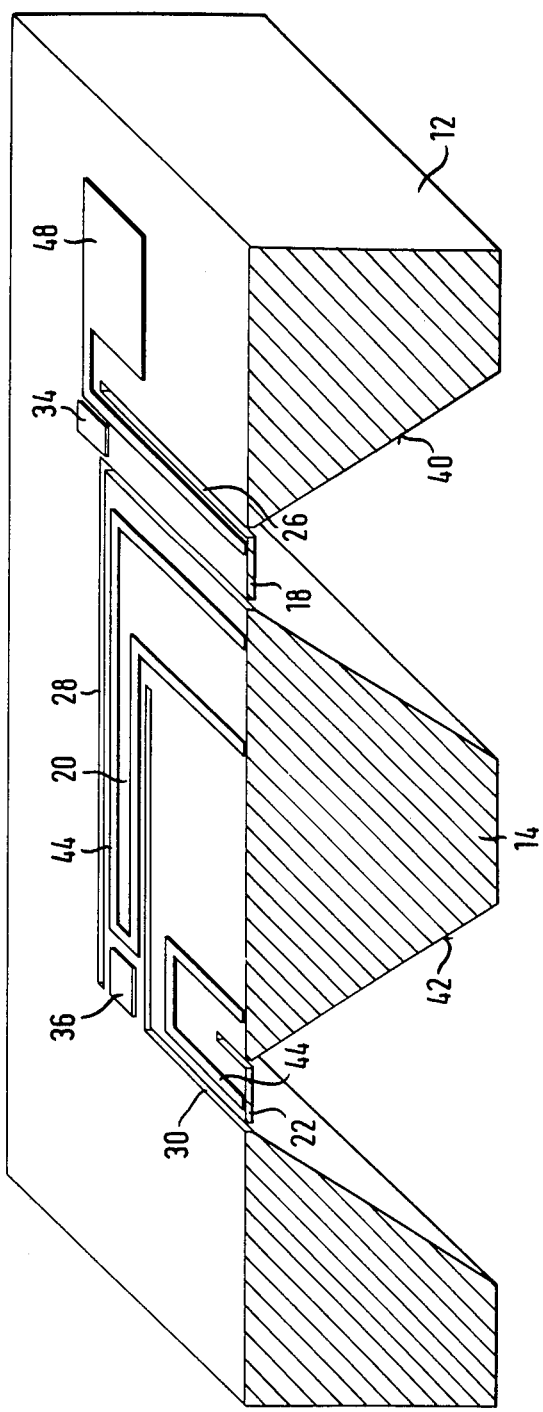
FIG. 2 is a perspective section along the line A-A of FIG. 1.

As apparent from the sectional view of FIG. 2 the force takeup element 14 has a relatively large thickness and the support elements 16 to 22 are thin leaf-spring-like strips which connect the force takeup element 14 to the base body 12. Under the action of a force acting perpendicularly to the surface extent thereof, the force takeup element 14 can be displaced upwardly or downwardly in the illustration of FIG. 2. The support elements 16 to 22 are thereby deformed and limit the maximum permissible deflection. In a region of the support elements 16 to 22 in which the latter deform when a force acts on the force takeup element 14 measuring members 32, 34, 36, 38 are disposed which respond to the deformation with a change of one of their physical parameters. These measuring members 32 to 38 may be piezoresistance elements whose electrical resistance changes under the influence of a mechanical deformation. When the measuring members 32 to 38 are connected for example in a bridge circuit in which an electrical current flows through the individual measuring members an electrical signal can be obtained which provides an indication whether and to what extent the support elements have deformed by a deflection of the force takeup element. Because of its thickness the force takeup element 14 has a defined mass which responds to an acceleration. The sensor illustrated is thus an acceleration sensor and the electrical signal which can be generated with the aid of the measuring members 32 to 38 provides information on the acceleration which the force takeup element 14 connected to the base body 12 has undergone. The section of FIG. 2 shows how the connection between a support element and the force takeup element 14 is made. In particular, it is apparent that the support element is integrally connected to the force takeup element 14.

The base body 12, the force takeup element 14 and the support elements 16 to 22 of the acceleration sensor 10 consist of monocrystalline silicon. The production of the sensor proceeds from a slice of monocrystalline silicon material into which according to the section of FIG. 2 grooves 40, 42 are etched.

These grooves 40, 42 are etched to a depth such that the force takeup element 14 is connected to the base body 12 only via webs having the thickness of the support elements 16 to 22 to be formed. Through the webs the slots 24 to 30 are then etched in the pattern shown by FIG. 1 so that the leaf-spring-like support elements 16 to 22 are formed. In the connection region between the support elements 16 to 22 and the base body 12 the measuring members 32 to 38 comprising piezoresistance material are then applied. The leads to the measuring members 32 to 38 are not an essential part of the invention and for simplicity are omitted in the drawings.

When the acceleration sensor 10 is subjected to a large acceleration a support element 16 to 22 can break so that the measuring member associated with the broken support element no longer indicates the deformation due to the respective acceleration. A conductor path 44 applied to the surface of the acceleration sensor 10 as metal layer permits continuous checking of the condition of the support elements 16 to 22; in particular, this conductor path 44 makes it possible to detect a broken support element. In accordance with FIG. 1 this conductor path 44 extends from a first terminal land 46 on the base body 12 via the support element 22, the force takeup element 14, the support element 16, back via the force takeup element 14, the support element 16, again via the force takeup element 14, the support element 20, again via the force takeup element 14 and finally via the the support element 18 to a second terminal land 48 on the base body 12. Because of the route outlined of the conductor path 44 the electrical connection between the terminal land 46 and the terminal land 48 is interrupted with certainty when one of the support elements 16 to 22 breaks due to an excessive acceleration acting on the sensor 10. Thus, before evaluation of the electrical signals obtained by means of the measuring members 32 to 38 it is possible to constantly check whether or not the sensor 10 is mechanically damaged, in particular whether or not one of the support elements 16 to 22 is broken. False measurements of the acceleration acting on the sensor are thus eliminated.

The conductor path 44 may be made of relatively low resistance on the surface of the sensor 10 so that a relatively large current can be passed through to check the condition. This large current insures that even when a hair crack occurs in a support element and consequently in the portion of the conductor path 44 disposed thereon an interruption of the current between the terminal lands 46 and 48 occurs with certainty because with a relatively large current the power loss at the hair crack in the conductor path is large enough to produce complete breakage of the conductor path by heating so that a clear error condition can be indicated.

FIG. 1 shows the conductor path 44 as independent conductor path which is not in connection with the measuring members 32 to 38. It is fundamentally also possible to apply the electrical supply lines of the measuring members 32 to 38 to the surface of the sensor 10 in such a manner that like the conductor path 44 they pass over all the support elements. With such a design the breakage of a support element would cause interruption of the measuring circuit so that a fault indication could be obtained in this manner as well.

Figure 3:
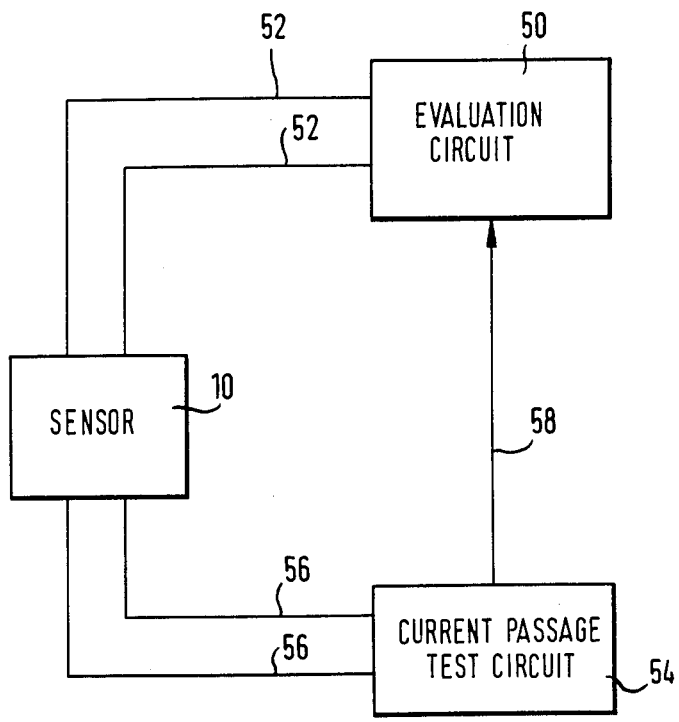
FIG. 3 is a block circuit diagram of an example of the use of the sensor of FIG. 1.

FIG. 3 illustrates the use of the sensor 10 in a block circuit diagram. The sensor 10 may be used as force sensor or as acceleration sensor. Which physical quantity is measured depends on the evaluation circuit 50. The evaluation circuit 50 sends via lines 52 a current through the measuring members 32 to 38 which are contained in the sensor and which as mentioned are formed as piezoresistance elements. If the piezoresistance elements deform due to an acceleration acting on the sensor 10 or a force acting on the force takeup element 14 the resistances of the piezoresistance elements change. The evaluation circuit can derive from the resistance change the acceleration or force acting. The current passage test circuit 54 sends via lines 56 a current through the conductor path extending between the terminal lands 46 and 48. As long as this current flows it indicates that the conductor path 44 is not interrupted. If however the current passage test circuit 54 detects that passage of a current through the conductor path 44 is no longer possible, due for example to breakage of a support element 16 to 22, it supplies to the evaluation circuit 50 via a line 58 a signal which renders the evaluation circuit inoperative. This means that the evaluation circuit 50 supplies measurement results only when all support elements 16 to 22 in the sensor 10 are in a satisfactory condition and accordingly correct measurement results can also be expected. As soon as a support element is broken, i.e. the sensor 10 would supply incorrect output signals, the evaluation circuit 50 does not produce any measurement result because as already mentioned it has been rendered inoperative by the current passage test circuit 54. In this manner, the display of incorrect measurement results is prevented with great certainty.

In the example of embodiment described the conductor path 44 is formed by a metal layer. The conductor path 44 may however also be made in another manner. For example, it can be a conductive zone produced by diffusion or ion implantation in the semiconductor material and extending like the conductor path 44 formed by a metal layer in the semiconductor material from the first terminal land via each support element and the force takeup element to the second terminal land.

I claim:

1. A sensor responding to the action of a force, comprising:
    a base body,
    a force takeup element,
    at least one support element which deforms under the influence of a force acting on the force takeup element, connecting the force takeup element and the base body,
    a measuring member which reacts to the deformation with a change of a physical parameter, disposed in the deformation region between said at least one support element and the force takeup element,
    an uninterrupted conductor path extending from a first terminal land on the base body via each support element and the force takeup element to a second terminal land on the base body,
    and an evaluation circuit connected to the measuring member, including a current passage test circuit connected to the terminal lands on the base body which on detection of an interruption of the current passage through the conductor path renders the evaluation circuit inoperative.

2. The sensor according to claim 1, wherein the force takeup element is substantially quadratic and in the region of its corners is connected to the base body via four support elements, each of which runs parallel to one edge of the force takeup element, the four support elements being separated along their longitudinal edges by slots from the base body and from the force takeup elemet and being connected at one end to the base body and at the other end to the force takeup element, and the conductor path between the two terminal lands being led via all four support elements.

3. The sensor according to claim 1 wherein the base body, each support element and the force takeup element are made integrally from monocrystalline silicon.

4. The sensor according to claim 3, wherein the conductor path comprises a metal layer fixedly disposed on the base body the force takeup element and the support elements.

5. The sensor according to claim 3, wherein the conductor path comprises a conductive zone formed in the monocrystalline silicon by diffusion.

6. The sensor according to claim 3, wherein the conductor path comprises a conductive zone formed in the monocrystalline silicon by ion implantation.

* * * * *